E. GRAY,
Assignor, by mesne assignments, to THE HARMONIC TELEGRAPH CO.
Electro-Harmonic Telegraphs.
No. 8,869. Reissued Aug. 26, 1879.
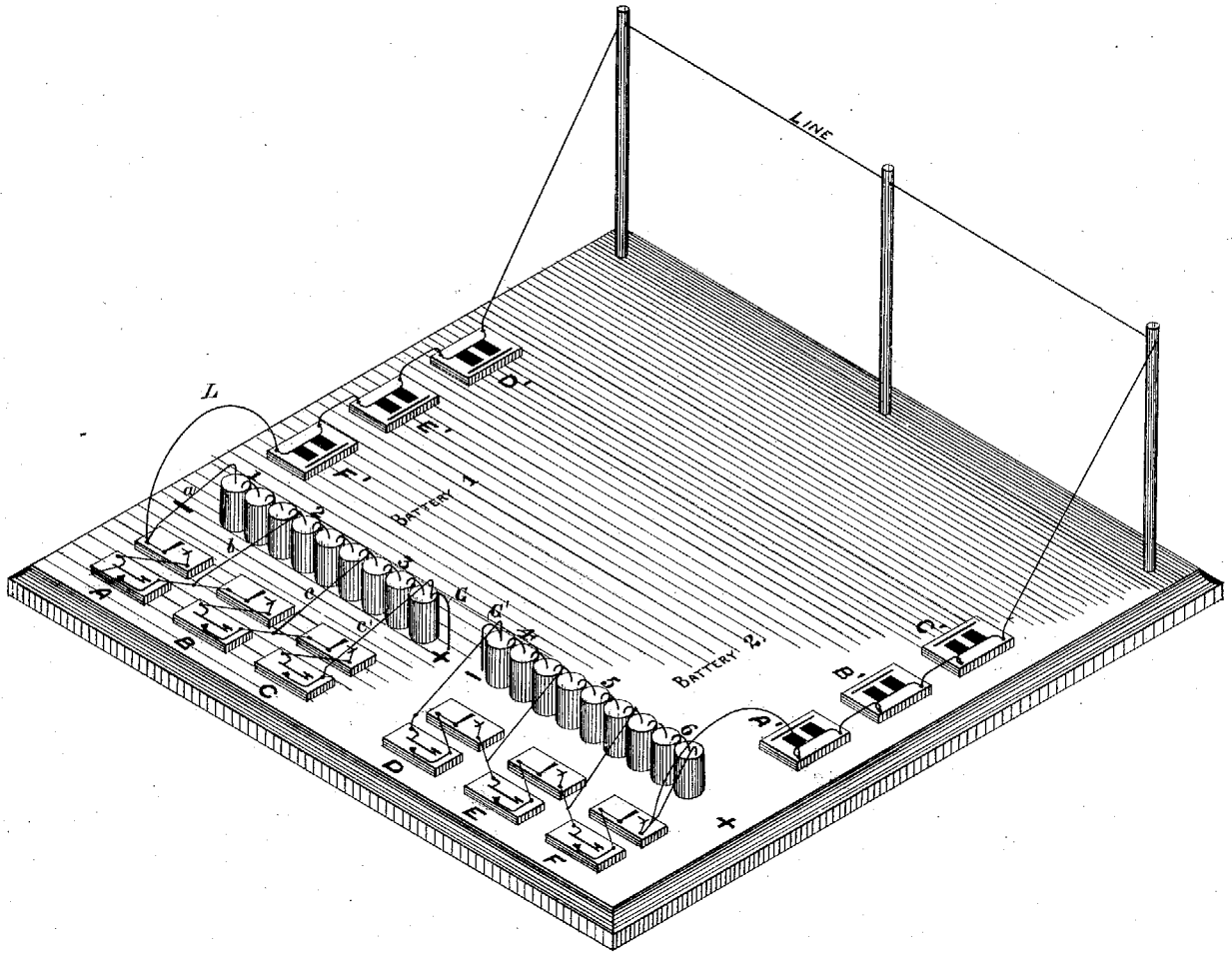
WITNESSES
Wm A Skinkle
Geo. W. Breck
INVENTOR
Elisha Gray.
By his Attorneys
Baldwin, Hopkins & Peyton
THE NORRIS PETERS CO., PHOTO-LITHO., WASHINGTON, D. C.

UNITED STATES PATENT OFFICE

ELISHA GRAY, OF CHICAGO, ILLINOIS, ASSIGNOR, BY MESNE ASSIGNMENTS, TO THE HARMONIC TELEGRAPH COMPANY, OF NEW YORK CITY.

IMPROVEMENT IN ELECTRO-HARMONIC TELEGRAPHS.

Specification forming part of Letters Patent No. 186,340, dated January 16, 1877; Reissue No. 8,869, dated August 26, 1879; application filed June 3, 1878.

*To all whom it may concern:*

Be it known that I, ELISHA GRAY, of Chicago, in the county of Cook and State of Illinois, have invented certain new and useful improvements in the art of transmitting and analyzing rhythmical impulses, vibrations, or waves representing musical impressions, sounds, or tones, of which improvements the following is a specification.

My invention, which is based upon well-known laws of acoustics, electricity, and electro-magnetism, relates to a novel art, method, or system of generating rhythmical vibrations or waves representing musical impressions, sounds, or tones, transmitting them through a closed electric circuit, and producing by them at the receiving end of the line corresponding magnetic vibrations or waves, the dynamic force of which is utilized to actuate the receiving-instrument; and comprises the following subdivisions:

First, a novel art, method, or system of working a constantly-closed electric circuit with a continuous current of varying strength, in which current rhythmical vibrations or waves representing musical impressions, sounds, or tones are produced by means of suitable transmitting apparatus.

Second, a novel art, method, or system of working a constantly-closed electric circuit with a continuous current of varying strength, in which current rhythmical vibrations or waves representing musical impressions, sounds, or tones are produced by means of a suitable transmitting apparatus, and producing corresponding magnetic vibrations at the receiving-station by the action of electro-magnetism operating to vary the normal magnetic intensity of constantly-polarized electro-magnets.

Third, a novel art, method, or system of working a constantly-closed electric circuit with a continuous current of varying strength, in which current rhythmical vibrations or waves representing musical impressions, sounds, or tones are produced by means of a suitable transmitting apparatus, and producing corresponding magnetic vibrations at the receiving-station in electro-magnets the cores of which are kept constantly polarized, and controlling said production by suitable signaling apparatus, so as to produce intelligible signals at a distant station.

Fourth, a novel art, method, or system of transmitting rhythmical vibrations representing two or more co-existent simple tones by the production, in a constantly-closed primary circuit, of an electric current, the intensity or effective strength of which is varied by the transmitting apparatus, so as to be at all times proportionate to the amplitude of the compound or resultant magnetic vibrations which are to be produced in the magnets at the receiving-stations.

Fifth, a novel art, method, or system of producing in a constantly-closed primary circuit an electric current of varying strength or intensity, and causing thereby at the receiving-station magnetic vibrations or waves, the amplitude of which at any given moment is correlated with and represented by a corresponding degree of strength in the electric current traversing the circuit at the same moment.

Sixth, a novel art, method, or system of telegraphically transmitting composite vibrations, which consists in working a closed electric circuit with a continuous current from a main battery, portions or the whole of which current are thrown into vibration at will by the transmitting apparatus.

Seventh, a novel art, method, or system of telegraphically transmitting and analyzing composite vibrations by working a closed circuit with a continuous current from a main battery, portions or the whole of which current are thrown into vibration at will by the transmitting apparatus, each set of vibrations being reproduced by a receiver capable of responding to such vibrations.

My invention is likewise, to some extent, based upon and more especially relates to an electro-harmonic system of multiple telegraphy heretofore invented by me, and shown in sundry Letters Patent.

In an application for Letters Patent of the United States filed by me February 23, 1875, for transmitting rhythmical vibrations by electricity, I have shown not only the various devices for transmitting or receiving the musical impressions, but also one method of arranging the electric circuit for producing the desired result, including the relation of the main battery to the line and instruments at both ends, and described the effects produced.

In my prior patents and application above mentioned, however, the full force of the battery was at all times exerted upon the line—that is to say, when one transmitter was employed and the others were at rest it was worked with the full force of the whole main battery, and when all the transmitters were employed the same force was necessarily divided among them. Consequently the amplitude of the vibrations of any given tone would diminish or increase according to the number of tones simultaneously sent to line, thus rendering analysis at the receiving end of the line more difficult My improvement possesses three distinguishing characteristics: First, that of a main circuit always closed; second, the passage through this circuit of a continuous or uninterrupted electric current which is of uniform strength when all the transmitters are quiescent, each transmitter when in operation throwing its respective portion of said current into vibration, so that the form of vibration existing in the normal current at any given time is the component or resultant of the several coexisting simple vibrations; and, third, the conversion of these composite or resultant electrical vibrations into magnetic vibrations of corresponding form, this last result being facilitated by keeping the cores of the receiving-magnets in a constantly-charged or magnetically-polarized state.

I have found by a series of experiments, made before the filing of the application for the original patent upon which this reissue is based, that a magnet in a polarized or constantly-charged condition is far more responsive to electrical vibrations transmitted through it from a given source of power than when in a neutral or non-polarized condition. In other words, if I wish to transmit a single tone, using only a single section of battery, this can be far more effectually done if the other sections of the battery are in the main line, although the current from them is not in any sense put in vibration, and the only function it performs is to keep the receiving magnet or magnets charged up to a certain degree of magnetic tension, which renders the magnet far more susceptible to any additional electrical vibration that may be thrown upon it.

In my experiments above mentioned I found where several tones are transmitted, each using a corresponding number of sections of battery in the line—such, for instance, as shown in the present case—that an independent means of keeping the receiving-magnet in a constantly-polarized state was unnecessary, as the magnets are kept in a sufficiently constant state of magnetic polarization by the continuous current in the manner hereinbefore described.

The accompanying drawings represent a perspective diagram of an apparatus embodying my improvements. I have shown three transmitters, with their corresponding receivers, batteries, and connections at each end of the line; but it will be obvious that a greater or less number of transmitters and receivers may be employed without departing from the principle of my invention.

It is deemed unnecessary to describe in detail here the construction of the battery, as it forms no part of the subject-matter claimed, and any of the well-known batteries of the present day may be used in connection with my improved method of transmission.

The construction of the transmitters and receivers here shown is fully set forth in the application and Letters Patent above mentioned, and need no reiteration here.

Each battery is connected with its respective transmitter by a short-circuit or shunt wire. Starting with battery No. 1, G is the ground-wire, connected at the plus (+) pole of the battery, which battery is connected up in the ordinary way and runs to line at the other or minus (—) end through suitable reproducing-receivers F′ E′ D′. The line connects at the other end through reproducing-receivers C′ B′ A′ to the plus (+) pole of the battery No. 2, and passes through in the ordinary way to the ground-wire G′ at the minus (—) pole of said battery. The particular form and arrangement of the receivers, however, forms no part of the invention claimed herein.

The circuit thus far is similar to an ordinary Morse circuit closed, and without a key or other means of making or breaking the circuit.

A B C D E F represent six sets of transmitters, each set being composed of a common open circuit, Morse telegraph-key, and a musical-tone transmitter—such, for instance, as that described in Letters Patent No. 165,728, granted to me July 20, 1875, for improvement in transmitters for electro-harmonic telegraphs. These transmitters are all alike in construction, but each one is tuned to a different pitch, and has a receiver, A′ B′ C′ D′ E′ F′, correspondently tuned, at the other end of the line.

Each battery is divided into sections 1 2 3 4 5 6, not by separating or disconnecting its cells, but by throwing a short-circuit or shunt wire around each section. For instance, the first short circuit of battery 1 consists of the wires *a b*, the second of the wires *b c*, and the third of the wires *c c′*, and so on.

The number of cells or electro-motive force required is determined by the distance the tones are to be transmitted.

Each shunt-wire runs through its own key and vibrating transmitter. For instance, in section 1 of battery 1, which is at the line end of the battery, a wire, *a*, passes from the minus (—) pole of the battery to one binding-screw of the transmitter A, at which point the circuit divides, one branch connecting to line L, and the other to the vibrating bar of the transmitter through the break-point, which is in this instance a shunting-point. The circuit then passes to the other binding-screw, and thence to the key-lever.

The anvil or lower point of the key is connected directly with the ends of the wire *b*, which forms the dividing-line between sections 1 and 2, forming part of the short circuit of each section, and so on. Now, if the reed or bar of transmitter A be vibrated by its local battery, (which is omitted from the drawings to avoid complication, but the operation of which is well understood,) and the key belonging to it and in the same circuit with it be depressed, the shunt-circuit around section 1 will be completed every time the vibrating bar or reed makes contact with the break-point, thus producing a set of waves or electrical vibrations throughout the line, the vibrations succeeding each other at the rate per second corresponding to the vibrations of the transmitting reed or bar, which vibrations will induce magnetic impulses of corresponding mechanical force in all the receiving-instruments in the circuit of this force approximating one-sixth of that due to the electro-motive force of the whole battery. Thus it will be observed that when two or more sets of vibrations are transmitted through the circuit simultaneously, the electro-motive force acting to produce a current at any given moment will depend upon the number of separate and distinct pulsations or vibrations which are being communicated to the line at that moment; and as the total resistance of the circuit remains, for all practical purposes, constant, the effective strength of current traversing the circuit and capable of acting upon the receiving apparatus is constantly being varied in a manner and to an extent precisely corresponding to the amplitude of the magnetic vibrations which it is desired to produce at the receiving-station. Although these magnetic impulses are produced equally in the cores of all the magnets in the circuit, and an equivalent mechanical action is exerted upon each one of the armatures of the several magnets, yet in the case just mentioned only the armature of the receiver marked A′ will respond to the magnetic impulses resulting from the action of the transmitter, it being the only one whose reed or ribbon, or reed and box, as the case may be, is tuned correspondently with the transmitter in operation.

All the other sections of the apparatus are connected up and operated in a manner precisely similar, each operating its own section of battery.

Each transmitter differs in pitch from every other one, and has it complement in its corresponding receiver.

Thus the individuality of each separate series of waves is always preserved, and they may be reproduced at the receiving-station with absolute fidelity and accuracy.

I claim as of my invention—

1. The hereinbefore-described novel art, method, or system of working a constantly-closed electric circuit with a continuous current, in which current rhythmical impulses, vibrations, or waves representing musical impressions, sounds, or tones are produced by means of suitable transmitting apparatus.

2. The hereinbefore-described novel art, method, or system of working a constantly-closed electric circuit with a continuous current, in which current rhythmical vibrations representing musical impressions, sounds, or tones are produced by means of suitable transmitting apparatus, and producing by them corresponding magnetic vibrations by means of electro-magnetism at the receiving-station in constantly polarized electro-magnets.

3. The hereinbefore-described novel art, method, or system of working a constantly-closed electric circuit with a continuous current, in which current rhythmical vibrations representing musical impressions, sounds, or tones are produced by means of suitable transmitting apparatus, producing by them corresponding magnetic vibrations at the receiving-station in constantly charged or polarized electro-magnets, and controlling said production by suitable signaling apparatus, so as to produce intelligible signals at a distant station.

4. The hereinbefore-described novel art, method, or system of transmitting rhythmical vibrations representing two or more coexistent simple tones by the production, in a constantly-closed primary circuit, of an electric current the intensity or effective strength of which is varied by the transmitting apparatus, so as to be at all times proportionate to the amplitude of the compound or resultant magnetic vibrations in the magnets at the receiving-station.

5. The hereinbefore-described novel art, method, or system of producing, in a constantly-closed primary circuit, an electric current of varying strength or intensity, which causes at the receiving-station magnetic vibrations or waves, the amplitude of which, at any given moment, is correlated with and produced by a corresponding degree of strength in the electric current traversing the circuit at the same moment.

6. The hereinbefore-described novel art, method, or system of telegraphically transmitting composite vibrations or tones, which consists in working a closed circuit with a continuous current from a main battery, portions or the whole of which current are thrown into vibration at will by the transmitting apparatus.

7. The hereinbefore-described novel art, method, or system of telegraphically transmitting and analyzing composite vibrations, which consists in working a closed circuit with a continuous current from a main battery, portions or the whole of which current are thrown into vibrations at will by the transmitting apparatus, each set of vibrations being reproduced by a receiver capable of responding to such vibrations.

ELISHA GRAY.

Witnesses:
WM. D. BALDWIN,
WM. J. PEYTON.